July 3, 1951 M. PARTIOT 2,558,909
COLLAPSIBLE WHEELED VEHICLE
Filed June 25, 1948 2 Sheets-Sheet 1
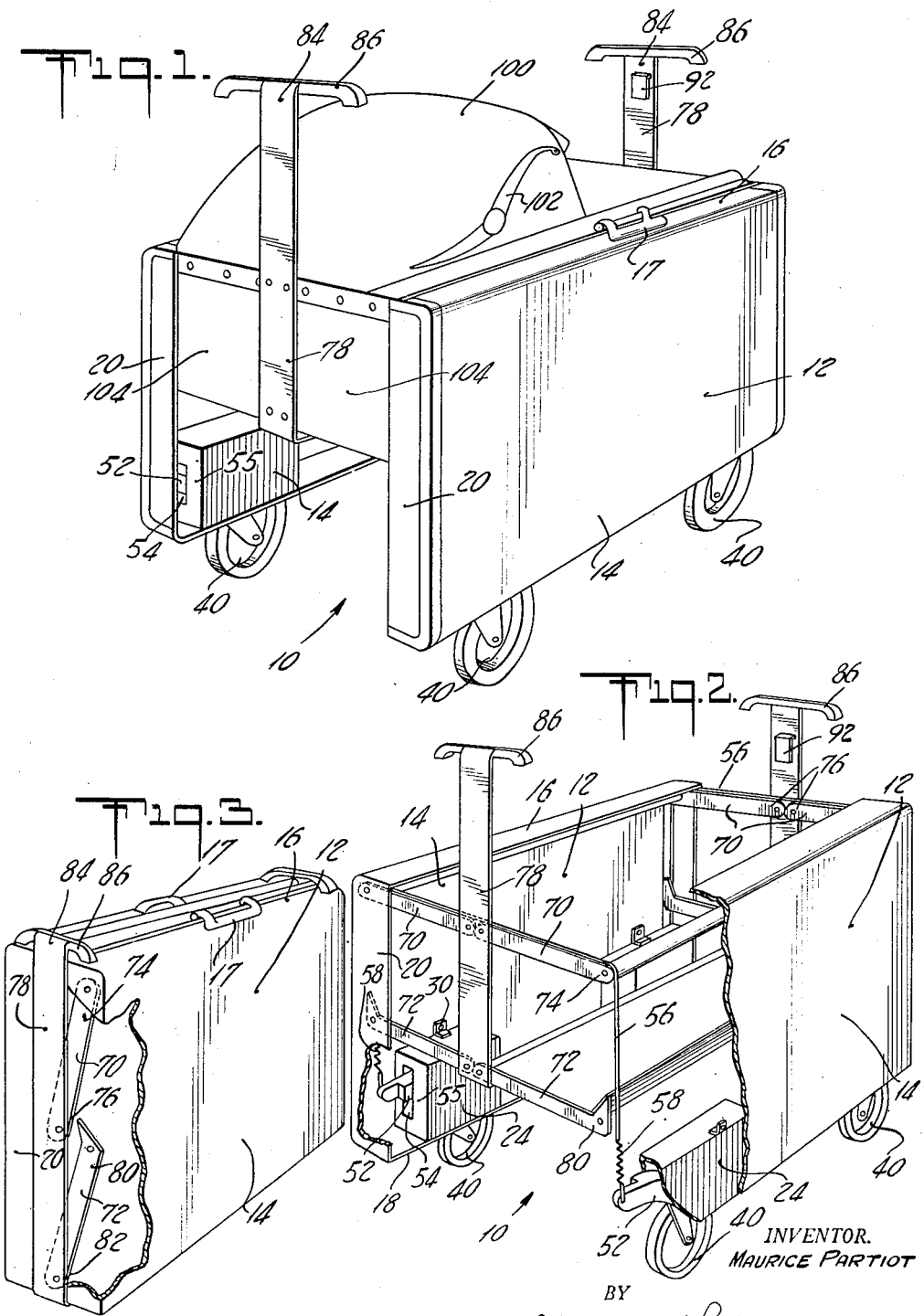

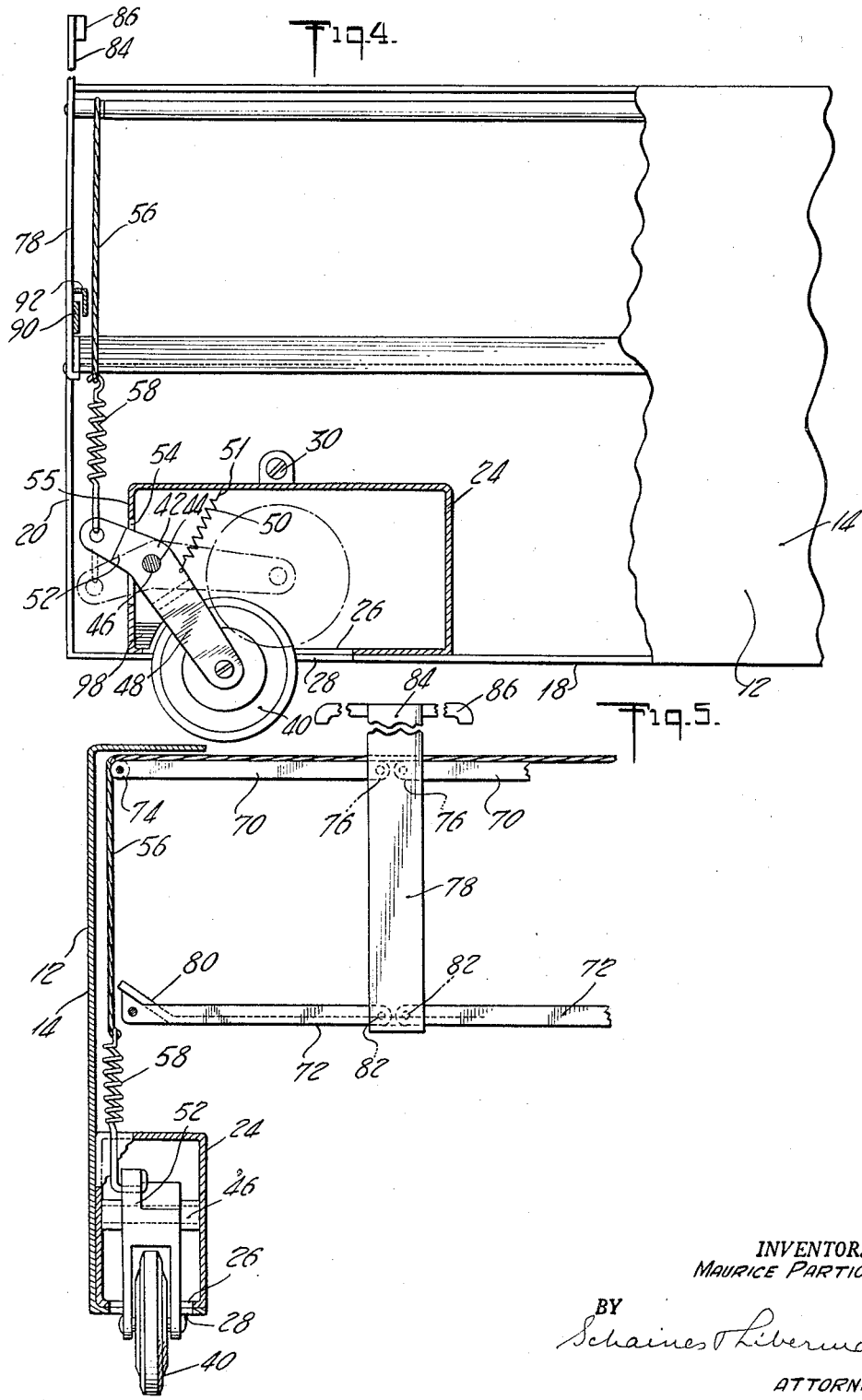

Patented July 3, 1951

2,558,909

UNITED STATES PATENT OFFICE 2,558,909

COLLAPSIBLE WHEELED VEHICLE

Maurice Partiot, New York, N. Y.

Application June 25, 1948, Serial No. 35,147

7 Claims. (Cl. 280—37)

The present invention relates generally to collapsible wheeled vehicles as cribs, baby carriages and the like, and in particular it relates to such vehicles wherein the sides form a container-enclosure for the device when it is collapsed for storage, shipment or the like.

The main object of the present invention is the provision of a collapsible wheeled vehicle, such as a combination crib and baby carriage, which comprises, under extension, a pair of side walls and an intermediate portion, and when collapsed is contained wholly within the compass of the side wall components forming an enclosure for the device.

Another object of my invention is the provision of a wheeled vehicle of the character described comprising a casing including a pair of side walls, a pair of wheels in each thereof, the side walls being separable and the wheels extensible from their mount on the walls into operative position, and means to maintain the wheels in operative position while the side walls are separated.

Another object of my invention is the provision of a wheeled vehicle of the character described comprising a casing formed of a pair of side wall members, a pair of wheels in each side wall member, housings for said wheels aligned with the side walls, the side walls being separable and the wheels being extensible out of the housings into operative position, and a linkage system between and secured to the side wall members to hold the same in spaced relation during use of the vehicle.

Other and further objects of the present invention will in part be obvious, and still others will be pointed out specifically in the following description of an illustrative embodiment of my invention. In the following specification, the word "crib" will be used to indicate a crib or carriage or any similar device, it being understood that the scope of the invention is to be limited only by the annexed claims.

In the drawings annexed hereto, and forming a part hereof,

Figure 1 is a perspective view of one form of device constructed according to and embodying my invention, illustrating the application thereof to a wheeled vehicle as a baby carriage;

Fig. 2 is a similar view, illustrating the application of my invention to a wheeled vehicle as a crib, with parts of the covering of the side walls broken away to show interior details;

Fig. 3 is a perspective view of the device in collapsed form, with a portion broken away;

Fig. 4 is a partial longitudinal section vertically through a side wall; and

Fig. 5 is partly a vertical section through an end portion of a side wall, and partly an end elevational view.

As will be readily appreciated, it is highly desirable to have a wheeled vehicle as baby carriage or crib in such form that it may be transported readily from place to place and occupy relatively little space, and unobjectionable from the standpoint of bulk or maneuverability. There have been known collapsible devices of this type in the past, but these have been entirely unsatisfactory either because too complicated in operation or construction or too bulky. With the device of the present invention, I have been able to achieve a combination crib or carriage which is of extremely simple construction and operation, which is easy to make and use, and which can be contracted and reduced to such small compass as to be enclosed within the outline of an ordinary suitcase-appearing article.

My device is indicated generally by reference numeral 10, and comprises a pair of hollow shells 12, 12 of identical size and shape. Each shell 12 consists of a main side wall panel 14, a top panel 16, a bottom panel 18, and a pair of end panels 20, 20. The shells may be formed as by stamping, molding or otherwise of a single blank of material or of a number of individual sections suitably joined together. Within each shell, on the bottom 18 and laterally aligned with the side wall panel 14 thereof, I provide a plurality of wheel housings 24, 24, comprising hollow box-like members each having an opening 26 in the floor thereof in registry with an identically dimensioned opening 28 in the bottom panel 18. Housings 24, 24 may be secured within the shell as by units 30 or otherwise, and are of such interior dimension as to receive therewithin a wheel 40, mounted at the end on an angulated lever 42, pivoted at 44 on shaft 46 journalled in the opposite side walls of housing 24. The longer arm 48 of lever 42, at the end of which wheel 40 is rotatably secured, extends normally into the interior of the housing, and is held therewithin by a weak normally contracting spring 50, one end of which is secured to arm 42 and the other end of which is attached to the underside of the top of the wheel housing, as at 51. The other and shorter arm 52 of lever 42 extends out of the housing through a slotted opening 54 in the outer end wall 55 thereof. Thus, with two wheel housings 24, 24 in each shell, as shown, the lever arms 52, 52 extend out of the housings toward the end walls 20, 20 respectively at opposite ends of the device, for reasons to be developed below.

A pair of elongated cables 56, 56 are provided, one for each end of the device, the terminals of each cable being provided with strong normally contracting coil springs 58, 58 which are connected to the free ends of the lever arms 52, 52 projecting from the wheel housings. Springs 58, 58 are necessarily of much greater strength than are springs 50, 50. For example, if spring 50 is responsive to a one-pound pull, springs 58, 58 will be of about fifteen to twenty pound pull strength. When shells 12, 12 are drawn together into the position illustrated in Figure 3, cable 56 will be relaxed, and may be disposed within the enclosure formed by the shells. There will be no tension on springs 58, 58 and they will be relaxed and free of any extending pulls. At that point, the normal contractile tendency of springs 50, 50 will be sufficient to draw lever arms 48, 48 and the wheels 40, 40 attached thereto into their respective housings. When shells 12, 12 are drawn apart, cables 56, 56 will be drawn taut over the framework or linkage system connecting the shells, placing springs 58 under tension and extending same. The contractile strength of springs 58, 58 will overcome springs 50, 50 and operating on lever arms 52, 52 will swing wheels 40, 40 out of their housings, into the operating position illustrated in Figs. 1, 2, 4 and 5.

Each shell 12 is provided with a plurality of link rods 70, 72, two at each end of each shell being shown in the illustrated embodiments. One end 74 of upper rod 70 is pivotally secured to end panel 20 at the top thereof, while the other end 76 of rod 70 is pivotally secured to the center of a vertically disposed center post 78, one of which is provided at each end of the device. One end 80 of lower lever rod 72 is pivotally secured to end panel 20 midway of the height thereof, while the other and inner end 82 of rod 72 is pivotally secured to the lower end of center post 78. As illustrated in the several figures, center post 78 is of such length that the upper end 84 thereof may extend slightly above the top of the shells when in compacted position (see Fig. 3), the top 84 of the post being provided with a suitable hand grip 86, as a cross-bar or the like.

When shells 12, 12 are drawn apart, either by manipulation thereof, or by raising the two center posts 78, 78, links 70, 72 will be brought to the horizontal position as illustrated in Figs. 2, 4 and 5. Any suitable or expedient means may be employed to lock links 70, 72 in the position shown, one such expedient being a cross bar 90 fitting across both the aligned links 72, 72 at an end of the device and held by a hook 92 on the inner face of post 78 (see Fig. 4). It will, of course, be understood that other means may be provided to lock the links in the horizontal position on extension of the system, those shown being illustrative of the possibilities.

The upper edges and ends of links 70, 70 may be grooved to slidably receive therewithin cables 56, 56 at each end of the device. The normal length of the cables 56, 56, with springs 58, 58 attached to each end thereof, is such that when the links 70, 70 (over which the cables pass) are brought into horizontal alignment, the springs 58, 58 at the opposite ends are placed under tension, bringing wheels 40, 40 down out of their housings into position below the shells.

As part of my invention, I also provide a brake mechanism so that when the device is extended or expanded into wheeled vehicle form, the wheels may be locked to hold the vehicle in one position. Referring to Figure 4, I provide a block 98 of wood, hard rubber or the like and dispose same within the wheel housing and adjacent the floor thereof. Block 98 is of such length as to extend out over the openings 26, 28 in line with wheel 40, and partly close same. When links 70, 70 are in ordinary horizontal alignment and cable springs 58, 58 tensioned thereby to bring wheels 40, 40 out of their housings, there will be no contact between the wheel periphery and block 98. However, when cable 56 is pulled upwardly and threaded over catch 92, cable 56 will be overtensioned and—acting on lever arms 52—will swing the wheel 40 into contact with and against stop 98. This friction engagement locks the wheel against rotation, and keeps the vehicle in one position. When cable 56 is released from catch 92, and the overtensioning of springs 58, 58 relaxed, wheels 40, 40 will be moved away from the block 98 and freed to rotate on their shafts.

Referring to Figs. 1 and 3, it will be seen that handle members as 17, 17 may be provided on the inner edge of top panels 16, 16 and suitable locks or catches may be provided to hold the two shells together, in suitcase form, when the device is collapsed for shipment or the like.

Referring to Fig. 1, I have illustrated the device of my invention applied to a baby carriage in which the structure is the same basically. However, when it is desired to incorporate the invention in a carriage, as something different from a crib, a hood portion 100 is provided, of any suitable material, the lateral edges of which are secured to the inner edges of the shells, which hood will be brought upwardly and locked by links 102 when the shells are drawn apart, to form a partial roof-like covering for the carriage. End wall sections, as 104, 104, are provided, the upper edges of which are fastened to the links 70, 70 and the lower edges to links 72, 72, with the sides of the sections fastened to the inner upper edges of the end panels 20, 20. Sections 104, 104 are necessarily of foldable material so they can be disposed inside the shells when the device is collapsed.

In all embodiments of my invention, the wheel housings are disposed within the shells or one of them, and the housings are vertically disposed within the vertically extending shells so that actuation of the wheel raising or lowering mechanism is simplified.

Having described my invention, what I claim and desire to secure by Letters Patent is:

1. A collapsible wheeled crib device of the character described comprising a pair of cooperating hollow shell members opening towards each other, a pair of wheels mounted on and within each shell, adjacent the ends thereof, a linkage system connecting the two shells, a cable connecting the wheels at each end of the device in pairs, the cable being connected to certain of the links and responsive to movement thereof, the linkage system being contractible to bring the shells together with the wheels disposed therewithin to simulate a suitcase, a crib floor portion connected to the linkage system and disposed within the suitcase on contraction of the linkage system, said floor portion on extension of the linkage system and separation of the shells being raised into operative position at right angles to the shells, to form a crib having a floor and side wall portions, extension of the linkage system also actuating the cable to shift the wheels from within the shells out therefrom and into ground engaging position.

2. A collapsible crib device of the character described comprising a pair of cooperating hollow shell members, the shells opening toward each other, each shell having a flat side wall portion and inwardly extended top, bottom and end wall members, a plurality of wheels within and connected to each shell, linkage means connecting the shells, cable means connected to the linkage and to the wheels, said cable means being responsive to movement of the linkage means, said linkage and cable means being contractible to bring the shells together to simulate a suitcase and retain the wheels inside the shells, said linkage and cable means being expansible to separate the two shells and move the wheels from the shells into operative position outside the shells, material disposed between the shells and secured to the connecting means, said material providing an internal floor portion for the crib on expansion of the connecting means.

3. A collapsible crib device as in claim 2 having wheel engaging springs mounted in the shells normally operable to retain the wheels within the shell on contraction of the linkage means.

4. A collapsible crib device as in claim 2, having wheel engaging springs mounted in the shells normally operable to retain the wheels within the shell, the cable means on extension of the linkage means overbearing the normal biasing of the springs to extend the wheels from the shells into the ground engaging position.

5. A collapsible crib device of the character described, comprising a pair of hollow shell members opening inwardly towards each other, each shell consisting of a side wall panel, a top panel, a bottom panel and end wall panels, a plurality of wheels disposed inside each shell, a linkage system between and connecting the shells, said system including a vertically extending center post at each end of the device and a plurality of pairs of links pivotally connected to the center post and to the shells, a cable system associated with the links and wheels, upward movement of the center posts raising the links to horizontality, and actuating the cable system, causing separation of the shells and lowering of the wheels into operative position with repect to the shells, means to retain the links in horizontal relationship, return downward movement of the center posts lowering the links and bringing the two shells together with the links therewithin and returning the wheels to within the shells.

6. A collapsible crib device of the character described, comprising a pair of hollow shell members opening inwardly towards each other, each shell consisting of a side wall panel, a top panel, a bottom panel and end wall panels, a plurality of wheel housings within each shell, registering openings downwardly in the shell and housing, a wheel within each housing, a linkage system disposed between and connected to the shell members, said linkage system including a vertically extending center post at each end of the device, a plurality of pairs of links pivotally connected to the center post and to the shells, and a cable connected to the wheels and running along the links, upward movement of the center posts raising the links to horizontality causing separation of the shells and tensioning the cable to cause lowering of the wheels downwardly through the housing openings, return downward movement of the center posts lowering the links, bringing the shells together with the links therewithin, and relaxing the cable to cause return movement of the wheels to within the housings in the shells.

7. A collapsible crib device of the character described, comprising a pair of hollow shell members opening inwardly towards each other, each shell consisting of a side wall panel, a top panel, a bottom panel and end wall panels, a wheel housing within each shell, a wheel therewithin, spring means normally retaining the wheel within its housing, a linkage system disposed between and connected to the shells, said system including a center post at each end of the device and a plurality of pairs of links pivotally connected to the center post and to the shells, and a cable running over the links connecting the wheels, upward movement of the center posts raising the links to horizontality and causing separation of the shells and tensioning the cable to cause lowering of the wheels from their housings into operative position below the shells, return downward movement of the center posts lowering the links bringing the shells together with the links therebetween and relaxing the cable permitting the wheels to return into their housings under the influence of their spring means.

MAURICE PARTIOT.

REFERENCES CITED

The following references are of record in the file of this patent:

UNITED STATES PATENTS

| Number | Name | Date |
| --- | --- | --- |
| 1,442,733 | Paschoal | Jan. 16, 1923 |

FOREIGN PATENTS

| Number | Country | Date |
| --- | --- | --- |
| 317,196 | Germany | Dec. 12, 1919 |
| 697,123 | France | Oct. 21, 1930 |